United States Patent Office 2,809,979
Patented Oct. 15, 1957

2,809,979

ORGANIC PHOSPHINODITHIOIC COMPOUNDS AND METHODS FOR PREPARING SAME

Willis G. Craig, Willoughby, Ohio, assignor to The Lubrizol Corporation, Wickliffe, Ohio, a corporation of Ohio No Drawing. Application January 26, 1954, Serial No. 406,327

7 Claims. (Cl. 260—429.9)

This invention is related to novel zinc salts of phosphinodithioic (dithiophosphinic) acids and an improved method for the synthesis of the same. In a more particular sense it is related to a modification of the aluminum halide-catalyzed reaction of aromatic compounds with phosphorus pentasulfide.

The copending application of Miller et al., for "Organic Phosphinodithioic Compounds and Methods for Preparing Same," Serial No. 406,323, filed January 26, 1954, and owned by the same assignee, discloses a method of preparing aromatic phosphinodithioic acids which comprises the reaction of an aromatic compound with phosphorus pentasulfide in the presence of an aluminum halide catalyst. Such a process is characterized by the use of relatively large amounts of aluminum halide. Since the aluminum halide used in this reaction is not economically recoverable, the cost of this chemical is a considerable factor in any estimate of the method's value.

It is accordingly one object of the present invention to provide a novel and improved method for the synthesis of zinc salts of organic phosphinodithioic acids. It is a further object of the invention to reduce the overall cost of preparation of zinc salts of organic phosphinodithioic acids. A still further object is to minimize the cost of catalysis in such preparations. Other and more specific objects of this invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

The above and other objects are achieved by the invention described hereinafter, whereby certain zinc salts of organic phosphinodithioic acids are made available by a process which is economical both of time and raw materials. This process involves the utilization of a reduced amount of aluminum halide and its effectiveness is thought to be the result of the formation of a stable salt.

Broadly stated, the invention relates to the preparation of zinc salts of certain organic phosphinodithioic acid which comprises reacting at least one aromatic compound containing at least one replaceable hydrogen atom attached to a benzenoid carbon atom, phosphorus pentasulfide, and zinc halide in the presence of aluminum halide.

By the term "aromatic compound" as used in the specification and appended claims, is meant an organic compound containing at least one resonant ring structure having at least one replaceable nuclear hydrogen attached to a benzenoid carbon atom, and devoid of reactive functional groups. The aromatic compound should be free of reactive functional groups, such as —OH, —SH, and —NH$_2$, which are reactive with phosphorus pentasulfide at low temperatures in the absence of a catalyst, and preferably those aromatic compounds having an ionization constant of less than: $1 \times 10^{-10}$ at 25° C. in aqueous solutions. Specific examples of aromatic compounds, including aromatic hydrocarbon compounds, unsubstituted and substituted, including mono- and poly-alkylated and cycloalkylated aromatic nuclei, which are useful as starting materials for the process of this invention include, for example, benzene, naphthalene, anthracene, phenanthrene, naphthracene, chrysene, pyrene, triphenylene, biphenyl, terphenyl, etc., and the substitution products of these, such as their alkylation products, halogenation products, nitration products, etc., such as toluene, xylene, mesitylene, ethyl benzene, diethyl benzene, iso-propyl-benzene, n-propyl-benzene, di-tert-butyl benzene, iso-butyl-benzene, n-butyl benzene, tert-amyl-benzene, cyclohexyl benzene, methylcyclohexyl benzene, capryl-benzene, diisobutyl-benzene, lauryl-benzene, cetyl benzene, paraffin-wax substituted benzene, nitro-benzene, chloro-benzene, polychloro-benzene, such as, dichloro-benzene and trichloro-benzene, lauroxy benzene, mono- and poly-chloro-biphenyl, capryl-biphenyl, phenoxy-biphenyl, phenoxy benzene, thiophenoxy-benzene, diisobutyl-phenoxy-benzene, mono- and poly-chloro-naphthalene, mono- and poly-chloro-anthracene, mono- and poly-chloro-phenanthrene, lauryl-phenanthrene, alkyl-chloro-aromatic hydrocarbons, such as, methyl-mono-chloro-benzene, methyl-polychloro-benzene, and ethyl-monochloro-anthracene, alkyl-mono-nitro aromatic hydrocarbons, such as, methyl-nitro-benzene, dimethyl-nitro-benzene, ethyl-dinitro-benzene, propyl-nitro-naphthalene, butyl-nitro-phenanthrene, etc.

The only phosphorus sulfide contemplated for use in the practice of this invention is $P_2S_5$. The other phosphorus sulfides are unsatisfactory.

The zinc halides contemplated include zinc chloride and zinc bromide, with special preference given to zinc chloride.

Aluminum halides which may be used include aluminum chloride and aluminum bromide, although aluminum chloride is preferred.

It has been discovered that the use of zinc halide allows a substantial reduction in the amount of aluminum halide which must be used. This represents an appreciable economy when the zinc halide merely replaces the aluminum halide pound for pound, in view of the marked price advantage which favors the former salt. This advantage is enhanced by the fact that under certain conditions zinc halide is economically recoverable while aluminum halide is not. Furthermore, it has been observed in some cases that a large portion of the aluminum halide is replaceable by a lesser quantity of zinc halide.

The subject matter of this invention is surprising in the light of the knowledge that in the total absence of aluminum halide the reaction of an aromatic compound with phosphorus pentasulfide to form a phosphinodithioic acid will not take place. Zinc halide, used alone, will not act as a catalyst in this reaction. As a consequence of this fact it was not expected that zinc halide would exert any catalytic activity in this reaction when used with aluminum halide.

When used alone as a catalyst in this reaction, aluminum halide generally is used in an amount equal to at least two moles, per mole of phorsphorus pentasulfide, in most instances more than two moles is desirable. In many cases four and even more moles of aluminum halide are used. In the process described herein a much smaller amount of aluminum halide is a satisfactory catalyst and the yield of phosphinodithioic acid in such cases is comparable to yields which are available from the use of larger amounts of aluminum halide used alone.

Although the mechanism of the reaction is now known, it is thought that the presence of zinc halide in the reaction mixture acts to stabilize the phosphinodithioic acid as it is formed. Thus as each molecule of phosphinodithioic acid is formed it may become associated with zinc halide to form a chemical complex. This in turn liberates hydrogen halide and the zinc salt of the phosphinodithioic acid. In the absence of either zinc halide or a large amount of aluminum halide a low yield of phosphinodithioic acid is obtained; one explanation for this may be that the product is not in itself sufficiently stable to withstand for long the conditions under which it is formed. Thus in such instances, the low yield may be an indication of the amount of decomposition of phosphinodithioic acid rather than an indication of extensive side reactions. The application of this suggested mechanism to the use of large quantities of aluminum halide presumes that only part of the aluminum halide acts as a true catalyst while the remaining part acts to stabilize the phosphinodithioic acid product. As the amount of aluminum halide user is reduced, the "stabilizing" action is reduced proportionately, and so proportionately is the yield.

With regard to the relative amounts of aluminum halide and zinc halide which are useful in the practice of this invention, it has been observed that as little as 0.5 mole of aluminum halide per mole of phosphorus pentasulfide is wholly satisfactory when used with 1.0 mole of zinc halide. In Example 1 it will be noted that these relative amounts have been used and that the yield of zinc diphenyl dithiophosphinate is 90 percent of the theoretical yield. It is apparent that the use of considerably less aluminum halide and zinc halide would allow the formation of at least a substantial quantity of phosphinodithioic acid salt. The use of larger amounts of aluminum halide and zinc halide is, of course, quite acceptable, within the limits of economic considerations.

The temperature of the reaction is generally that of the refluxing reaction mixture, although in the case of volatile starting materials such as benzene, toluene, etc. it is advisable to utilize a higher temperature than can be attained simply by heating such reaction mixtures at reflux temperature. In such cases the reactants are placed in an autoclave and the reaction is carried out under pressure thus allowing the use of a higher temperature. Usually the range of temperature will be from 130° C. to 250° C., although temperatures outside of this range have been employed with success.

As indicated above, superatmospheric pressures may be employed and in some instances it is quite desirable to employ such pressures.

The duration of the process is usually in the range of 1–10 hours. Because of the stabilizing action of the zinc halide the time may be extended beyond this upper limit without untoward effects.

The immediate product of the process is a zinc salt of the particular phosphinodithioic acid. Thus the reaction is particularly convenient when the zinc salt is desired for a particular use, for example, as a lubricant additive. When the free acid is desired, it is necessary only to treat the zinc salt product with a mineral acid, usually hydrochloric acid. The free phosphinodithioic acid will thereby be precipitated from solution and can be obtained by decantation, filtration, or centrifuging. The acid may be purified by conversion to its sodium salt and reprecipitation of the free acid by treatment with a mineral acid. Purification of the crude zinc salt has been accomplished simply by boiling an aqueous suspension of the impure salt.

Recovery of zinc halide from the process can be effected by treatment of the particular zinc phosphinodithioate with hydrochloric acid. The resulting mixture is decanted or filtered to give the dithiophosphinic acid on the one hand, and an aqueous solution of zinc halide. This latter solution may be concentrated to give zinc halide of sufficient quality for further use in the process of this invention.

The invention may be illustrated in greater detail by the examples which are presented hereinafter, solely for purposes of illustration and not as limitations on the invention.

EXAMPLE 1

*Preparation of the zinc salt of diphenylphosphinodithioic acid*

A mixture of 1700 ml. (19.2 moles) of benzene, 222 grams (1 mole) of phosphorus pentasulfide, 67 grams (0.5 mole) of aluminum chloride, and 136 grams (1 mole) of zinc chloride was heated in an autoclave to 200° C. Nitrogen was admitted to a pressure of 250 p. s. i., and this pressure was maintained for 1.0 hour by bleeding off gas as the pressure rose above 250 p. s. i. The mixture was allowed to cool and was treated with an equal volume of water. The resulting mixture was filtered, yielding 504 grams (89.5 percent of the theoretical yield) of a solid which was shown to have the following:

|  | Percent |
|---|---|
| Sulfur | 15.6 |
| Phosphorus | 7.9 |
| Zinc | 7.9 |

This product was purified by boiling in water for one hour, then filtered. The solid product was identified as the substantially pure zinc salt of diphenylphosphinodithioic acid, by the following analyses:

|  | Percent |
|---|---|
| Sulfur | 21.1 |
| Phosphorus | 11.2 |
| Zinc | 11.2 |

EXAMPLE 2

*Preparation of the zinc salt of di-(chlorophenyl) phosphinodithioic acid*

A mixture of 560 grams (5.0 moles) of chlorobenzene, 222 grams (1.0 mole) of phosphorus pentasulfide, 272 grams (2.0 moles) of zinc chloride, and 134 grams (1.0 mole) of aluminum chloride was heated at 130° C. for four hours, then at 170° C. for five hours. The reaction mixture was diluted with 300 ml. of benzene, treated with water, and filtered. The organic layer was isolated from the filtrate and concentrated to a tan solid which weighed 520 grams, 74.2 percent of the theoretical yield. This solid was identified as the substantially pure zinc salt of di-(chlorophenyl) phosphinodithioic acid by the following analyses:

|  | Percent |
|---|---|
| Sulfur | 17.6 |
| Phosphorus | 8.9 |
| Zinc | 10.5 |

EXAMPLE 3

*Preparation of the zinc salt of di-(sec-amyl phenyl) phosphinodithioic acid*

A mixture of 222 grams (1.0 mole) of phosphorus pentasulfide, 136 grams (1.0 mole) of zinc chloride, and 133 grams (1.0 mole) of aluminum chloride was added portionwise to 600 grams (4.0 moles) of sec-amyl benzene, which was stirred at 40–60° C. Thereafter the temperature was raised with continued stirring over a period of one hour to 130° C. and maintained at 130–140° C. for four hours. When the brown, opaque mixture had cooled, 250 ml. of benzene was added and the mixture was poured with stirring into an excess of cold water. The resulting mixture was filtered, and the benzene layer was isolated from the filtrate and concentrated to a highly viscous red oil, and was identified as substantially pure zinc salt of di-(sec-amyl phenyl) phosphinodithioic acid by the following analyses:

|  | Percent |
|---|---|
| Sulfur | 12.1 |
| Phosphorus | 7.5 |
| Zinc | 3.0 |

EXAMPLE 4

*Preparation of the zinc salt of bis-(dichlorophenyl) phosphinodithioic acid*

A slurry of 1029 grams (2.0 moles) of o-dichlorobenzene, 222 grams (1.0 mole) of phosphorus pentasulfide, 272 grams (2.0 moles) of zinc chloride, and 67 grams (0.5 mole) of aluminum chloride was heated at reflux temperature in an atmosphere of nitrogen for seven hours. The reaction mixture was cooled and poured with stirring into ice, then filtered. The filtrate yielded a benzene layer which upon concentration yielded in turn a violet, resinous solid, identified as the substantially pure zinc salt of bis-(dichlorophenyl) phosphinodithioic acid by the following analyses:

| | Percent |
|---|---|
| Sulfur | 16.4 |
| Phosphorus | 7.9 |
| Zinc | 10.5 |

EXAMPLE 5

A mixture of 666 grams (3.0 moles) of phosphorus pentasulfide, 201 grams (1.5 moles) of aluminum chloride, 408 grams (3.0 moles) of zinc chloride, and 4485 grams (57.6 moles) of benzene was placed in a pressure vessel and nitrogen was introduced to a pressure of 250 p. s. i. g. The mixture was heated at 200° C. for an hour during which time 12 cu. ft. of gas was released from the vessel, the atmosphere therein being maintained at 250 p. s. i. g. by adding nitrogen as needed. The product mixture was cooled and treated, still in the pressure vessel, with one liter of water. The resultant mixture was filtered and the solid material was collected as product.

This combined product was washed twice with benzene, then suspended in five liters of benzene and treated with hydrochloric acid. The exothermic neutralization warmed the mixture from 28° C. to 55° C. This mixture was filtered, the benzene layer separated from the filtrate and concentrated by heating to a final temperature of 100° C./4 mm. The residue crystallized (green needles) and was shown by analyses to be

| | |
|---|---|
| Percent sulfur | 25.9 |
| Percent phosphorus | 12.4 |
| Neut. no | 222 (acidic) | diphenylphosphinodithioic acid.

While the examples herein are concerned with the zinc salt of phosphinodithioic acids, it should be understood that other metal salts may be also employed such as the metals of Group II of the Mendeleeff Periodic Table which include zinc, cadmium, magnesium, barium, etc.

The salts of phosphinodithioic acids of this invention can be employed as improving agents in lubricating oils and greases, and particularly for such purposes as producing improved lubricants for uses in crankcases of internal combustion, jet aviation devices, tops cylinder regions, steam cylinders, steam locomotives, railway cars, gas engines, refrigerating machines, and hydraulic, compressor, turbine, spindle, and torque converter mechanisms. Other suitable uses are in asphalt emulsions, insecticidal compositions, fireproofing and stabilizing agents in plasticizers and plastics, paint driers, rust inhibiting compositions, pesticides, foaming compositions, cutting oils, metal drawing compositions, flushing oils, textile treatment compositions, tanning assistants, metal cleaning compositions, emulsifying agents, antiseptic cleansing compositions, penetrating agents, gum solvent compositions, fat splitting agents, flotation agents, and improving agents for hydrocarbon fuels, etc.

Other modes of applying the principle of the invention may be employed, change being made as regards the details described, provided the features stated in any of the following claims, or the equivalent of such, be employed.

I therefore particularly point out and distinctly claim as my invention:

1. The process for the preparation of zinc salts of aromatic phosphinodithioic acids which comprises preparing a mixture of an aromatic compound selected from the class consisting of aromatic hydrocarbons and halogenated aromatic hydrocarbons, phosphorus pentasulfide, an aluminum halide selected from the class consisting of aluminum chloride and aluminum bromide, and a zinc halide selected from the class consisting of zinc chloride and zinc bromide; and heating said mixture at a temperature within the range of about 130° C. to about 250° C.

2. The process for the preparation of zinc salts of aromatic phosphinodithioic acids which comprises preparing a mixture of an aromatic compound selected from the class consisting of aromatic hydrocarbons and halogenated aromatic hydrocarbons, phosphorus pentasulfide, aluminum chloride and zinc chloride; and heating said mixture at a temperature within the range of about 130° C. to about 250° C.

3. The process of claim 2 characterized further in that the aromatic compound is an aromatic hydrocarbon.

4. The process of claim 2 characterized further in that the aromatic compound is an alkyl-substituted aromatic compound.

5. The process of claim 2 characterized further in that the aromatic compound is a chloro-substituted aromatic compound.

6. The process of claim 1 characterized further in that the aromatic compound is an alkyl-substituted aromatic compound.

7. The process of claim 1 characterized further in that the aromatic compound is a chloro-substituted aromatic compound.

References Cited in the file of this patent

UNITED STATES PATENTS

| | | |
|---|---|---|
| 2,274,302 | Mulit | Feb. 24, 1942 |
| 2,316,082 | Loane et al. | Apr. 6, 1943 |
| 2,316,087 | Gaynor et al. | Apr. 6, 1943 |
| 2,356,074 | May | Aug. 15, 1944 |
| 2,506,902 | Smith et al. | May 9, 1950 |